(12) United States Patent
Smith et al.

(10) Patent No.: US 6,841,117 B1
(45) Date of Patent: Jan. 11, 2005

(54) WIDE MOUTH BLOW MOLDED PLASTIC CONTAINER, METHOD OF MAKING SAME, AND PREFORM USED THEREIN

(75) Inventors: Marvin Lee Smith, Dallastown, PA (US); Robert Andrew Stewart, York, PA (US); Tracy Marie Momany, Sylvania, OH (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 10/369,839

(22) Filed: Feb. 20, 2003

Related U.S. Application Data

(62) Division of application No. 09/813,503, filed on Mar. 21, 2001, now Pat. No. 6,555,191, which is a division of application No. 09/126,170, filed on Jul. 30, 1998, now Pat. No. 6,228,317.

(51) Int. Cl.[7] ............................ B29C 39/02; B29D 22/00
(52) U.S. Cl. ........................ 264/535; 264/536; 264/161; 264/528
(58) Field of Search ..................... 264/500, 519, 264/520, 523, 528, 535, 536, 161, 138

(56) References Cited

U.S. PATENT DOCUMENTS

| | | | |
|---|---|---|---|
| 3,651,186 A | 3/1972 | Hall | 264/94 |
| 4,305,904 A | 12/1981 | Black | 264/536 |
| 4,445,406 A | 5/1984 | Thatcher | 82/46 |
| 4,496,064 A | 1/1985 | Beck et al. | |
| 4,539,463 A | 9/1985 | Piccioli et al. | 219/121 LG |
| 4,549,066 A | 10/1985 | Piccioli et al. | 219/121 LG |
| 4,576,843 A | 3/1986 | Beck et al. | 428/35 |
| 4,589,559 A | 5/1986 | Hayashi et al. | |
| 4,618,515 A | 10/1986 | Collette et al. | 428/35 |
| 4,665,682 A * | 5/1987 | Kerins et al. | 53/452 |
| 4,865,533 A | 9/1989 | Hart et al. | 425/527 |
| 4,894,268 A | 1/1990 | Greenwood et al. | 428/36.42 |
| 5,011,648 A | 4/1991 | Garver et al. | 264/521 |
| 5,066,528 A * | 11/1991 | Krishnakumar et al. | 428/36.92 |
| 5,182,122 A | 1/1993 | Uehara et al. | 425/526 |
| 5,617,768 A | 4/1997 | Palazzolo | 82/47 |
| 5,730,914 A | 3/1998 | Ruppman, Sr. | 264/28 |
| 5,887,739 A | 3/1999 | Prevot et al. | 215/382 |
| 6,395,865 B2 * | 5/2002 | Schmidt et al. | 528/272 |

* cited by examiner

Primary Examiner—Harold Pyon
Assistant Examiner—Michael C. Miggins
(74) Attorney, Agent, or Firm—Howson and Howson

(57) ABSTRACT

A wide-mouth plastic container is formed from a preform that is blow-molded to form an intermediate container article that has blown threads located below a moil. The moil is severed above the blown threads to yield the finished container. A preform and process for manufacturing the wide-mouth container are disclosed.

6 Claims, 2 Drawing Sheets

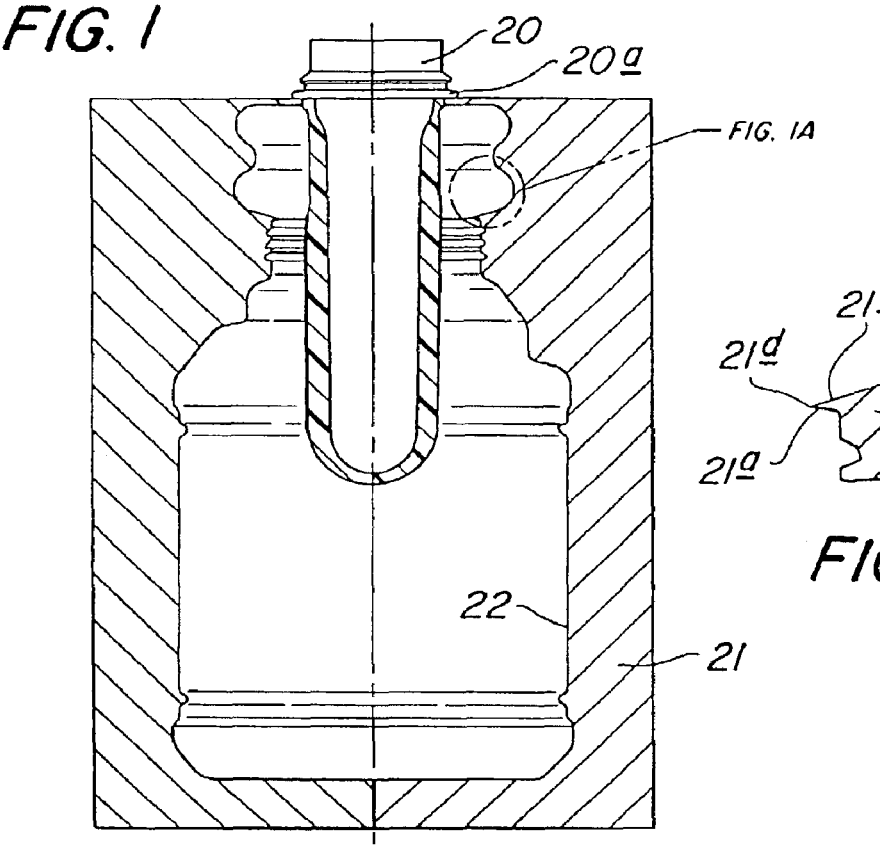
FIG. 1
FIG. 1A
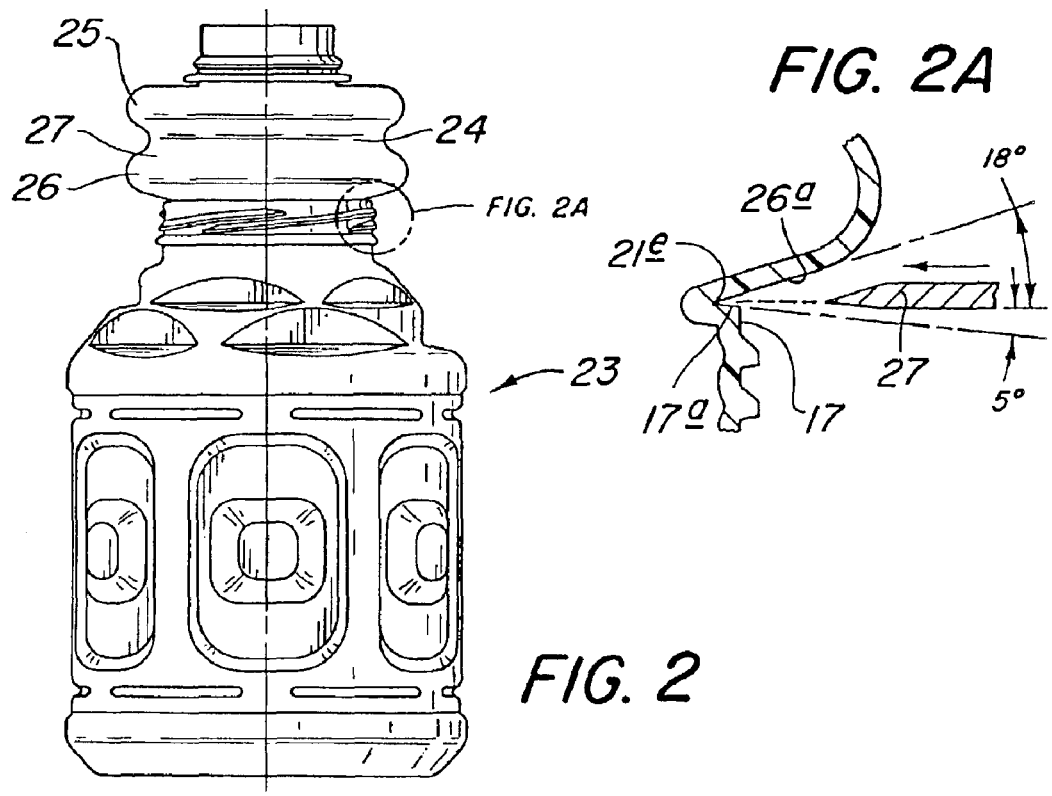
FIG. 2A
FIG. 2

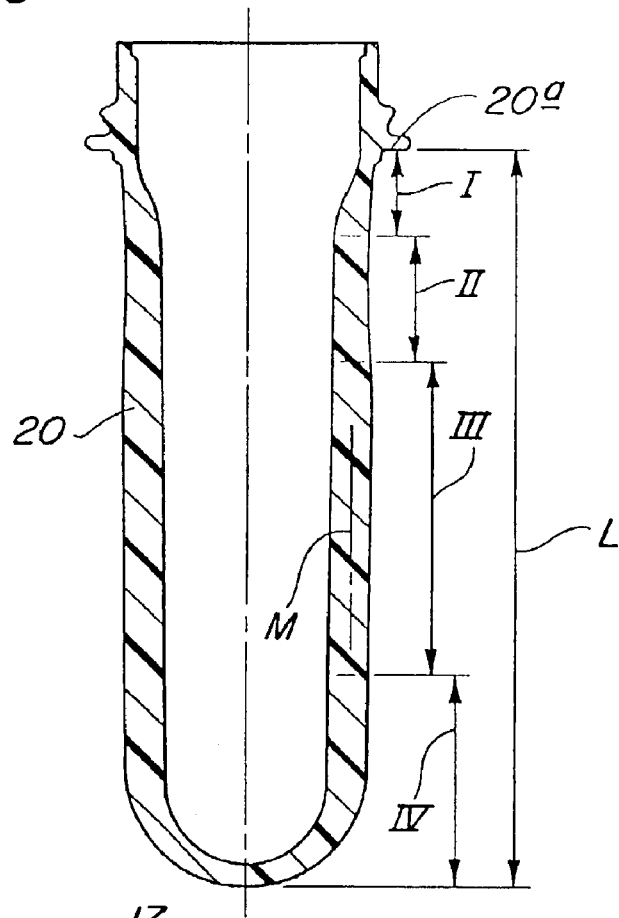
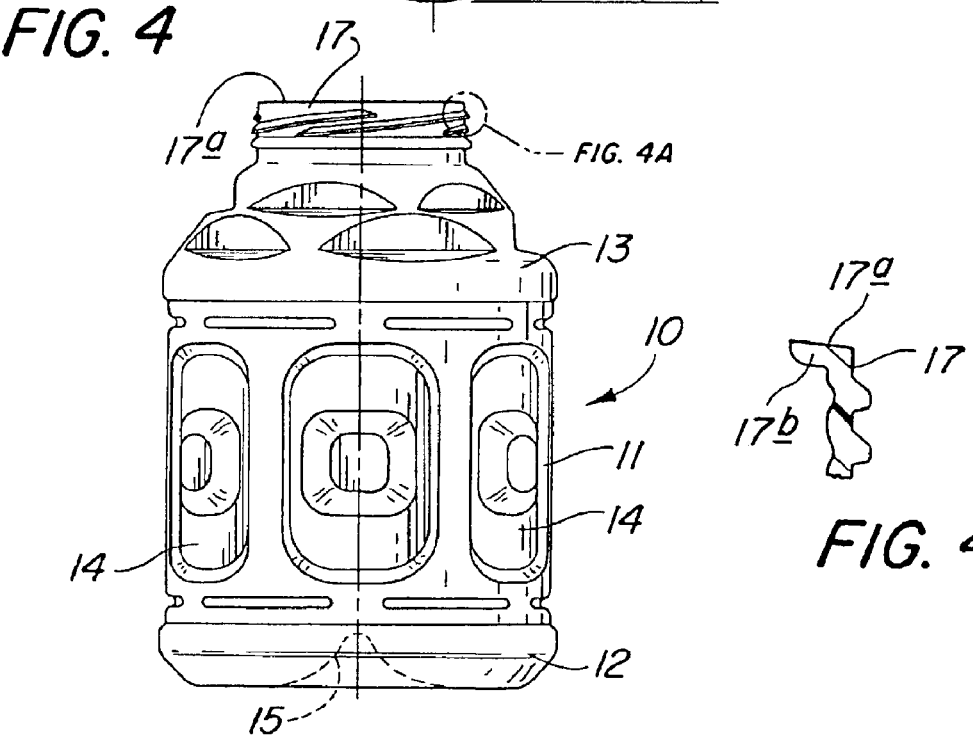

WIDE MOUTH BLOW MOLDED PLASTIC CONTAINER, METHOD OF MAKING SAME, AND PREFORM USED THEREIN

CROSS-REFERENCE TO RELATED APPLICATION

The present application is a division of application Ser. No. 09/813,503 filed on Mar. 21, 2001, now U.S. Pat. No. 6,555,191, which is a division of application Ser. No. 09/126,170 filed on Jul. 30, 1998, now U.S. Pat. No. 6,228,317 B1.

FIELD OF THE INVENTION

The present invention relates to wide mouth blow-molded plastic containers, and more particularly, the present invention relates to such containers which are particularly suited for hot fill applications.

BACKGROUND OF THE INVENTION

In the manufacture of blow molded plastic bottles for containing liquids, such as beverages, it is customary to utilize an injection-molded preform having a threaded finish which forms the threaded finish of the container blown from the preform. The preform may be injection molded from a variety of desirable plastic materials, a currently particularly preferred material being polyethylene terephythalate (PET).

In hot fill applications, i.e. applications where the blown container is filled with a liquid at a temperature in excess of 180° F. (82° C.), capped immediately after filling, and allowed to cool to ambient temperatures, vacuum absorption panels are generally provided in the body of the container to accommodate vacuum induced shrinkage resulting from the cooling of the container contents. In such containers, the injection molded threaded finish undergoes a minimal amount of distortion in the hot fill process. Hot fill containers molded of PET by this technique have found widespread acceptance in the marketplace.

For quite some time, there has been a need in the marketplace for a so-called wide-mouth container for hot fill applications. A wide mouth container enables the consumer to scoop-out contents which are not readily flowable. In the early 1980's, attempts were made to produce hot fillable PET containers having wide mouths by blow molding a thread on a portion of a PET preform below the threaded finish, thereby forming an intermediate article having a threaded region with blown threads. The intermediate article had a moil portion above the blown threads. The moil portion was subsequently severed, leaving a finished wide-mouth container. This manufacturing technique and resulting containers are disclosed in U.S. Pat. Nos. 4,496,064; 4,618,515; and 4,665,682.

For reasons not fully known, these wide-mouth containers were not successful in the marketplace. There is, however, a current need for a hot fillable wide mouth container which is particularly suited for packaging viscous products, such as applesauce, and the like.

OBJECTS OF THE INVENTION

With the foregoing in mind, a primary object of the present invention is to provide a commercially satisfactory wide-mouth blow-molded plastic container which is particularly suited for viscous fluid hot fill applications.

Another object of the present invention is to provide a suitable wide mouth blown plastic container which has a blown finish that resists distortion resulting from hot fill processing.

A further object of the present invention is to provide a method of manufacturing a wide-mouth container, and a preform, which is enables commercially acceptable hot fillable wide-mouth plastic containers to be produced by means of high speed manufacturing equipment in a manner that ensures consistent quality and performance.

SUMMARY OF THE INVENTION

In the present invention, a preheated preform is disposed in a mold cavity having a particular surface configuration which enables an intermediate container article to be severed at a precise location. The moil design cooperates with the preform to ensure the accurate placement of desirably-thick crystallized material in the blown threaded finish. It also produces an inturned flange on the inside of the blown threaded finish after the moil portion of the intermediate article has been severed. The moil portion is severed by rotating the intermediate article relative to an elongate cutter as the intermediate article advances. The preform has regions of varying thickness along its wall to provide desired material thicknesses at preselected locations in the wall of the resulting container. Preform pre-heat and mold temperatures are controlled precisely for achieving the desired hot fillable container. Also, bayalage cooling is utilized in the region of the blown threaded finish to prevent material shrink-back and to achieve the desired distortion resistance.

BRIEF DESCRIPTION OF THE DRAWINGS

The foregoing and other objects, features and advantages of the present invention should become apparent from the following description when taken in conjunction with the accompanying drawings in which:

FIG. 1 is a schematic longitudinal sectional view of a portion of a blow mold cavity illustrating a preform mounted in the cavity prior to blowing;

FIG. 1A is a greatly enlarged sectional view of the mold cavity of the region delineated as 1A in FIG. 1;

FIG. 2 is a side elevational view of an intermediate article having a moil formed when the preform shown in FIG. 1 is blown into the mold cavity;

FIG. 2A is a greatly enlarged cross-sectional view of the region indicated as 2A in FIG. 2;

FIG. 3 is an enlarged longitudinal sectional view of the preform illustrated in FIG. 1;

FIG. 4 is side elevational view of the wide mouth container formed after the moil portion illustrated in FIG. 2 has been severed; and FIG. 4A is a greatly enlarged cross sectional view of the portion of FIG. 4 delineated as FIG. 4A.

DESCRIPTION OF THE PREFERRED EMBODIMENT

Referring now to the drawings, FIG. 4 illustrates a wide mouth container 10 which embodies the present invention. The container 10 has a generally cylindrical body region 11 located between a standing ring 12 and a faceted dome 13. A plurality of peripherally spaced vacuum panels 14 of conventional design are provided in the body region 11 for accommodating vacuum induced volumetric shrinkage and supporting a label, as well known in the art. A base push-up 15 is provided in the bottom of the container. The wide mouth container 10 is the subject of a copending utility application filed on Oct. 3, 1997, Ser. No. 08/942,556, entitled Ovalization and Crush Resistant Container, owned by the assignee of the present application, the disclosure of which is incorporated by reference herein.

The present invention has applicability to wide-mouth grippable containers such as disclosed in copending design application Ser. No. 29/086,911 filed Apr. 22, 1998 entitled Grip Container owned by the assignee of the present application.

The container 10 has a wide-mouth threaded finish 17. A wide-mouth finish defined a finish having an outside diameter greater than about 2.0 inches, or 50 mm. The advantage of a wide mouth is that it affords ingress into the interior of the container to enable a consumer to scoop out viscous contents such as applesauce, and the like. As disclosed in the aforementioned utility patent application, the facets provided in the dome region cooperate to resist top loads and provide an anti-ovalization function, and to provide a small measure of vacuum absorption when the container has been hot filled, capped, and allowed to cool to ambient temperatures.

One of the problems that has arisen in connection with the manufacture of wide mouth containers is the undesirable distortion of the blown container finish due to hot fill processing. Distortion is undesirable because a distorted threaded finish cannot function well in automatic cap applying equipment. Moreover, an undistorted finish is desirable to ensure seal integrity after the cap has been applied and tightened.

One aspect of the present invention provides a method for providing a distortion-resistant threaded finish on a wide-mouth container. To this end, as seen in FIG. 1, a specially designed pre-heated preform 20 is provided in a mold cavity 21. The preform blown in the mold cavity 21 forms an intermediate container article 23, such as illustrated in FIG. 2. The intermediate container article 21 has a moil portion 24 with axially spaced upper and lower flanges 25 and 26 that form therebetween a belt-engaging groove 27. The moil portion 24 is subsequently severed to provide the finished container 10 as shown in FIG. 4.

More specifically, and with reference to FIG. 1, the mold cavity 21 has an interior mold surface 22 which corresponds to the overall outer configuration of the intermediate container article 23 below the preform flange 20a. An important aspect of the present invention resides in the region of the mold surface which is shown greatly enlarged in FIG. 1A. As best seen therein, the inner surface 22 of the mold 21 has a radially outwardly extending surface 21a (relative to preform center line A) and disposed substantially perpendicular to the longitudinal axis A of the preform 20, and has an outwardly and downwardly inclined surface 21b intersecting the radial surface 21a to define a tapered protrusion 21c that terminates in an acute bight 21d. The lower radial surface 21a forms the upper surface 17a of the blown threaded finish 17, and the downwardly inclined mold surface 21b forms the undersurface 26a of the moil portion lower flange 26.

When the preform 20 is blown in the mold cavity, it forms a threaded finish 17 having a wall of substantially uniform thickness, such as illustrated in FIG. 2A, in which the lower flange 26 extends laterally outward beyond the outer edge of the threaded finish 17. This structure is advantageous since it affords precise control of the amount of plastic material positioned in the blown threaded region. In the preferred embodiment, the material thickness is substantially constant in a range of about 0.040 to about 0.045 inches, or about 1.0 to about 1.2 mm.

The protrusion 21d is severed by application of a cutting means directed radially inward into the bight 21e as illustrated in FIG. 2A. The cutting angle is preferably substantially parallel to the surface 17a, but may be inclined up to the angle defined by the surface 26a, which, in the illustrated embodiment, is about 18°. A preferred cutting means is an elongate heated knife blade 27 which severs the protrusion wall when the intermediate container article of FIG. 2 is rotated about its longitudinal axis as it advances along a track with a moving belt engaged in the groove to rotate the intermediate article relative to the knife blade 27. Preferably, the blade 27 is maintained at a temperature in a range of about 132° C. to about 154° C. If desired, however, other conventional cutting means may be employed, such as laser beams, heated wires, and the like.

After cutting, the upper end of the threaded finish has an inturned flange 17b, such as illustrated in FIG. 4A. The inturned flange 17b reinforces the threaded finish 17 against ovalization and thereby enables it to resist distortion after hot filling, both before and after capping. Moreover, the thus severed upper surface 17a of the flange, inclined at about a 5° angle, provides a smooth accurately-controlled, axially resiliently deformable surface for sealing against the inner surface of a closure, not shown. By cutting radially, as contrasted with axially as disclosed in U.S. Pat. No. 4,618, 515, the inturned flange 17b provides a measure of stiffness that ensures a more uniform cut across the entire plane of the resulting threaded finish sealing surface 17a.

In addition to the aforementioned structural aspects of the mold and intermediate container article, the present invention contemplates a certain level of crystallinity in the threaded finish region in order to achieve desirable ovalization and shrinkage resistance. Preferably, the threaded finish region has a crystallinity in a range of about 20% to about 25%, and most preferably about 25%. The crystallinity is achieved by performing certain process steps under conditions to be described, and particularly cooling of the interior of the threaded region by a bayalage gas at a predetermined temperature for a predetermined period of time.

To achieve the desired intermediate container article 23, a preform 20 of a particular configuration is desirable. A preferred preform is illustrated in FIG. 3. As illustrated, the preform 20 has a tubular body with a closed bottom and an open top surrounded by a peripheral flange 20a which supports the preform in the mold cavity 21 (FIG. 1). The preform 20 is divided longitudinally into various regions corresponding to various regions of the immediate container article and, ultimately, the container itself.

As best seen in FIG. 3, the preform 20 has a conventional first, or transition, region I of a predetermined axial extent located below its flange 20a. The transition region I has an inside taper and a narrow neck located immediately below the flange 20a. The transition region I corresponds to the moil forming region 24 of the intermediate container article 23. A second region II below the transition region I forms the threaded finish 17 of the container; a third region III below the second region II forms the dome 13 and body 11 of the container; and a fourth region IV below the third region III forms the balance of the container. The third region III has interior and exterior wall surfaces spaced equidistantly from a longitudinal median M. The second region II has a wall thickness which is thinner than that of the third region III. Preferably, the second region II wall thickness is reduced by locating its exterior surface closer to the median M than the exterior surface of the third region II. The wall thickness of the third region III in a range of 5.5 to about 5.9 mm; and the wall thickness of the second region II is in a range of about 5.1 to about 5.3 mm.

The preform is preferrably injection molded of polyethelene terephythalate (PET) which is a copolyester resin having a crystalline peak melting point of less than 235 C, preferably about 234° C. (as contrasted with a 245° C. resin used in conventional hot fill PET containers) and with corresponding lower crystallization rates. The resulting container is characterized by a haze value, in the region below the blow finish 17 of less than 1.0, and more, as measured by a Hunter Labs, Color Quest 2 spectrophotometer.

By way of example and not by way of limitation, in fabricating a 48 ounce container having an overall length of 7 inches, or 178 mm, from the upper edge of its finish to the bottom of the standing ring, a preform having a length L of 4.85 inches, or 123 mm, measured from below the outer peripheral flange to its bottom is preferably employed. The length of the transition, or first, region I is about 0.450 inches; (11.5 mm) and the length of the second region II is about 0.750 inches (19 mm). The inside diameter of the third region is about 1.0 inch (25 mm). The outside diameter of the third region is about 1.45 inches (37 mm); and the outside diameter of the second region is about 1.42 inches (36 mm). The lengths are measured at the midpoints of the smooth transitions between the various changes in diameters. Preferably, the ratios of the axial extent of the second region II to the axial extent of the first region I is in a range of about 2:1 to about 1.5:1. The volumetric ratio of the second region II to the third region III is about 0.85 to 1.0.

When blowing an intermediate container article 23 from the preform 20, certain process conditions should be maintained. By way of example, the preform 20 is preheated to a uniform average temperature of about 108° C. before being disposed in the mold cavity 21. Preferably, the mold cavity 21 is maintained at a temperature in a range of about 138° C. to 143° C. The portion of the mold cavity forming the base of the container is maintained at a temperature in a range of about 49° C. to about 54° C.

Various regions of the preform are heated to various temperatures before it is placed in the mold cavity 22. Preferably, the second region II forming the threaded finish 17 is heated to a temperature in a range of about 104° C. to about 106° C. The body, dome and base portions of the preform is preheated to a temperature in a range of about 100° C. to about 115° C.

After the mold is closed, the preform is distended by means of blow air admitted at a pressure of 40 bar for a time in a range of about 1.5 to about 3.0 seconds. A stretch cooling rod, not shown, admits bayalage cooling gas at a temperature in a range of about 20° C. to about 40° C. against the inside of the blown container article in the region of the blown threads for a dwell time period in a range of about 0.5 to about 1.5 seconds depending upon the temperature of the bayalage gas, with shorter times required for cooler gases. To ensure the absence of post-molding finish distortion, the blown finish 17 needs to be at a temperature below about 80° C., and more preferably about 76° C. before exiting the mold cavity, with cooling being effected at a preferred rate of about 15 BTUs per minute per mold cavity.

The container has an overall height from the upper edge of the threaded finish to the bottom of the standing ring of about 7.0 inches (178 mm), and a body outside diameter of 4.5 inches (114 mm). The design volumetric capacity of the container is 48 oz., or 1.42 liters. The resulting container can be hot-filled with semi-liquid contents to a temperature in excess of 90° C., i.e. a range of 195° F. to 200° F., without undergoing undesirable distortion.

While a preferred method and embodiment has been described in detail, various, alterations and changes may be made without departing from the spirit and scope of the present invention as defined in the appended claims.

What is claimed is:

1. A method for forming a blow molded PET plastic container having an externally-threaded wide mouth finish produced by a process comprising the steps of:

disposing a preheated preform in a mold cavity having a surface with a container body forming region comprising a predetermined wall thickness for substantially its entire axial extent, a thread forming region comprising a wall thickness, an outer diameter, and an axial extent which are less than a wall thickness, an outer diameter, and an axial extent of said container body forming region, wherein said thread forming region is above and connected to said body forming region, and a moil forming region comprising an inner diameter that tapers inwardly toward said thread forming region, wherein said moil forming region is above and connected to said thread forming region, said mold cavity having at least one recess extending radially inwardly of said mold cavity surface immediately superadjacent a thread forming surface of said mold cavity, said preform having an interior surface and a preheated exterior surface in said thread forming region thereof;

distending said pretreated preform against said mold surface to form an intermediate container article having a moil region with a flange region extending radially outward of a threaded region, wherein said threaded region is connected to said moil region;

cooling an interior surface of said thread region; and severing said moil region radially between said radially-extending flange region and said threaded region to produce a wide mouth container.

2. A method for forming a blow molded PET plastic container according to claim 1, wherein said threaded region of said wide mouth container has an upper end with a radially inward extending upturned annular flange providing an axially resiliently deformable surface for sealing against an inner surface of a closure.

3. A method for forming a blow molded PET plastic container according to claim 2, wherein said upturned flange region is inclined at about a 5° angle relative to a plane extending perpendicular to a longitudinal axis of said container.

4. A container made by the method of claim 1, comprising a blow molded container body having an externally-threaded wide mouth finish with an upper end having a radially inward extending upturned annular flange providing an axially resiliently deformable surface for sealing against an inner surface of a closure.

5. A container according to claim 4, wherein said upturned flange is inclined at about a 5° angle relative to a plane extending perpendicular to a longitudinal axis of said container.

6. A container according to claim 5, wherein said blow molded container body is made of PET.

* * * * *